(12) United States Patent
Tsutsui et al.

(10) Patent No.: US 7,156,743 B2
(45) Date of Patent: Jan. 2, 2007

(54) MECHANICAL FUSE AND METHOD OF MANUFACTURING THE SAME

(75) Inventors: Tadayuki Tsutsui, Matsudo (JP); Kei Ishii, Higashi Katsushika-gun (JP); Yoshihiro Tanimura, Chiryu (JP); Kouji Yamada, Okazaki (JP); Yuuichi Aoki, Chita-gun (JP)

(73) Assignees: Hitachi Powdered Metals Co., Ltd., Matsudo (JP); Denso Corporation, Kariya (JP)

( * ) Notice: Subject to any disclaimer, the term of this patent is extended or adjusted under 35 U.S.C. 154(b) by 0 days.

(21) Appl. No.: 09/993,562

(22) Filed: Nov. 27, 2001

(65) Prior Publication Data

US 2002/0092146 A1 Jul. 18, 2002

(30) Foreign Application Priority Data

Nov. 30, 2000 (JP) ............................. 2000-366129

(51) Int. Cl.
*F16D 9/00* (2006.01)
*B32B 15/02* (2006.01)
*B32B 15/04* (2006.01)
*B32B 15/18* (2006.01)

(52) U.S. Cl. .................. 464/32; 428/566; 428/613; 428/632; 428/681; 428/684; 428/704

(58) Field of Classification Search ............ 428/472, 428/566, 472.1, 613, 612, 659, 658, 681, 428/682, 687, 684, 627, 632, 634, 45, 131, 428/134, 136, 220, 372, 699, 704, 702, 332, 428/200; 417/319; 464/32
See application file for complete search history.

(56) References Cited

U.S. PATENT DOCUMENTS

| 3,956,531 | A | * | 5/1976 | Church et al. ............... 427/226 |
| 4,504,312 | A | * | 3/1985 | Oaku et al. ..................... 75/244 |
| 4,836,848 | A | | 6/1989 | Mayama et al. ............... 75/231 |
| 4,846,769 | A | * | 7/1989 | Allen .......................... 474/218 |
| 4,943,321 | A | * | 7/1990 | Akutsu ......................... 75/243 |
| 5,049,183 | A | | 9/1991 | Saka et al. ..................... 75/244 |
| 5,427,600 | A | * | 6/1995 | Itoh et al. ...................... 75/232 |
| 5,561,834 | A | * | 10/1996 | Score ........................... 419/19 |
| 5,703,304 | A | * | 12/1997 | Lindberg et al. ............... 75/243 |
| 5,800,137 | A | * | 9/1998 | Eitai et al. ................... 417/319 |
| 5,800,636 | A | * | 9/1998 | Tsukada et al. ............. 148/306 |
| 5,873,784 | A | * | 2/1999 | Iwasaki et al. ............... 464/32 |

(Continued)

FOREIGN PATENT DOCUMENTS

DE 37 44 550 9/1988

(Continued)

*Primary Examiner*—Michael E. Lavilla
(74) *Attorney, Agent, or Firm*—Oliff & Berridge, PLC

(57) ABSTRACT

An inexpensive mechanical fuse having a high fatigue limit ratio and high rupture reliability, and superior in forming performance, and a method of manufacturing the same are presented. The mechanical fuse is composed of Fe-based sintered alloy, and comprises an inner rim 2 fixed to one power transmission shaft, an outer rim 3 fixed to the other power transmission shaft, and plural arms 4 for linking the inner rim 2 and outer rim 3, which are formed integrally. The arms 4 include rupture portions 6 which are ruptured when exposed to an overload torque. By treating in steam, an iron oxide phase is formed in the surface layer and pore inner wall. The iron oxide phase is effective to form round pores and lower the notch sensitivity. As a result, the fatigue strength and fatigue limit ratio are enhanced.

10 Claims, 1 Drawing Sheet

U.S. PATENT DOCUMENTS 6,068,452 A     5/2000   Okada et al. ............... 417/223
6,332,842 B1 *  12/2001  Tabuchi et al. ............... 464/33

FOREIGN PATENT DOCUMENTS

| DE | 38 08 460 | 9/1988 |
| DE | 40 31 408 | 4/1991 |
| DE | 44 37 452 | 4/1995 |
| DE | 198 12 312 | 10/1998 |
| DE | 199 21 934 | 11/2000 |
| EP | 0 499 392 | 8/1992 |
| JP | 07-112231 | 5/1995 |
| WO | WO 97/47418 | 12/1997 |

* cited by examiner

MECHANICAL FUSE AND METHOD OF MANUFACTURING THE SAME

BACKGROUND OF THE INVENTION

The present invention relates to a mechanical fuse for cutting off power transmission when an overload occurs in a power transmission device to protect the safety of the device, and a method of manufacturing the same.

The mechanical fuse is provided, for example, in a power transmission device interposed between a driving side and a driven side (for example, between a driving shaft and a driven shaft) for transmitting the rotating power of the driving side to the driven side. It acts to break down by itself cut off power transmission by force when a large difference occurs between the driving side and the driven side in the midst of transmission of rotating power, thereby avoiding occurrence of lock or rupture due to propagation of overload torque to one side.

Such mechanical fuse is generally composed of a rupture member which is substantially ruptured, disposed between two fixing members fixed to the driving side and driven side so as to link these fixing members. The rupture member is specifically shear pin or shear plate, which is required to be ruptured securely when a specified torque is applied. The magnitude of the torque to lead to rupture can be adjusted by the material and sectional area of the rupture member, but if the rupture member is made of an unstable material which is lowered in strength by fatigue due to repeated exposures to load, the reliability is low and it is not practical. As the material for satisfying such requirements, hitherto, ceramics have been widely used because of stability in fatigue strength and high fatigue limit ratio (ratio of fatigue strength to tensile strength, determined by fatigue strength÷tensile strength).

Ceramics are stable in fatigue strength, but are expensive, and hence inexpensive mechanical fuses have been demanded. There is also a need for mechanical fuse in a form of integrating rupture members to fixing members at both sides and interposing rupture portion between fixing portions for the purpose of improving the assembling efficiency and generality, but the mechanical fuse in this form is not used at the present, because there are problems in that it is hard to assure the strength of fixing portions and in that broken pieces scatter about when it is ruptured.

SUMMARY OF THE INVENTION

It is hence an object of the present invention to provide a mechanical fuse comprising fixing portions for fixing two power transmission shafts, and a rupture portion for linking these fixing portions composed in an integral structure, which is inexpensive, has high in rupture reliability due to high in fatigue limit ratio, and is superior in forming properties, and a method of manufacturing the same.

The mechanical fuse of the present invention is composed of Fe-based sintered alloy. Pores of the Fe-based sintered alloy is the roundness of 0.004 or more and is the round shape.

Preferably, the mechanical fuse of the present invention is composed of Fe-based sintered alloy in which iron oxide phase is formed in the surface layer and pore inner wall.

Since the mechanical fuse of the present invention is a sintered compact of Fe-based material, it is easy to form even if complicated in shape, and can be manufactured at low cost. Since ferroalloy is characterized that stable region of fatigue strength when exposed to stress repeatedly, is relatively long as compared with nonferrous alloy, it is easy to design the rupture portion, and in other words, since the rupture stress tends to be constant, a high rupture reliability is obtained. Besides, since the Fe-based sintered alloy is variable in tensile strength depending on porosity, the density can be utilized as an element of designing conditions of rupture portion, and rupture stress is thereby more easily adjusted.

Further, since the mechanical fuse of the present invention has round pores with the roundness of 0.004 or more, notch sensitivity is dull, lowering of strength due to fatigue is suppressed, and a high fatigue limit ratio is obtained. Roundness of pores is the ratio of actual area of pore to the area of virtual pore determined by peripheral length of pore. When the peripheral length of pore is represented by L and the area of pore is represented by S, the roundness is expressed as $4\pi S/L^2$, and the value is in a range of $0<\text{roundness}\leqq 1$ (true circle). As the roundness is closer to 1, it is closer to true circle, and it is shown that the pores are round. When the roundness is 0.004 or more, notch sensitivity is lowered, the fatigue strength is improved, and the fatigue limit ratio is heightened.

As a method for obtaining such round pores, an activated sintering method in which the oxygen content is increased in a green compact before sintering and is reduced by sintering is known. In this method, specifically, the green compact is sintered after heating and oxidizing at high temperature, or treating in steam. Besides, round pores are also formed by a method for sintering at higher temperature than ordinary sintering temperature (about 1100 to 1150° C.). Further, by adding an element for generating much liquid phase in the sintered compact, the sintering can be activated. By treating the Fe-based sintered alloy in steam as described below, moreover, an iron oxide phase is formed in the surface layer and pore inner wall, and round pores are thereby easily obtained.

The composition of the mechanical fuse of the present invention is characterized in that at least one of Ni, Cu, Mo, Cr, and Mn is contained at 0.7 to 5 mass % and the C content in overall composition is 0.1 to 0.7 mass %.

The additive element is effective to reinforce the iron matrix, and to enhance the tensile strength and fatigue strength, and the capacity of bringing about such effects is greater in the written order. However, the fatigue limit ratio is equal when the content of each additive element is uniform. The fatigue limit ratio is about 0.3 when these elements are not contained, and it reaches the maximum (about 0.45) when these elements are added at 2 to 3.5 mass %. As the content increases, the fatigue limit ratio decreases. When the content of the additive element is in a range of 0.7 to 5 mass %, the fatigue limit ratio is about 0.35, and the effect of addition is noted. Hence, the content of the additive element is specified in a range of 0.7 to 5 mass %.

The fatigue limit ratio exceeds 0.35 when the C content in the overall composition is 0.1 mass %, reaches the maximum (0.45) when the C content is in a range of 0.3 to 0.5 mass %, and decreases below 0.35 when the C content exceeds 0.7 mass %. Hence, the C content for enhancing the fatigue limit ratio to 0.35 or higher is in a range of 0.1 to 0.7 mass %.

The mechanical fuse of the present invention is preferred to be further processed by a mechanical process for providing with compressive residual stress such as shot peening, mechanical plating, etc., and/or a metallurgical process for providing with compressive residual stress such as soft nitriding, etc. In these processes for providing with compressive residual stress, the mechanical fuse surface is provided with residual compressive stress and is enhanced in the fatigue strength, so that the fatigue limit ratio is further enhanced. Besides, the soft nitriding has not only an effect of providing with the compressive residual stress, but also an effect of improving the wear resistance by enhancing the surface hardness of the mechanical fuse. The process for providing mechanical residual stress and the soft nitriding process, if both are given, are not specified in the sequence of processes.

The mechanical fuse of the present invention has preferably its surface coated with zinc chromate film. In the mechanical fuse coated with zinc chromate film, surface pores are sealed effectively, and oxidation is prevented by the zinc chromate film superior in corrosion resistance. As a result, lowering of rupture stress is suppressed, and the rupture reliability is further enhanced.

As a specific structure of the mechanical fuse of the present invention, it is interposed between two power transmission shafts, and comprises an inner rim fixed to one power transmission shaft, an outer rim fixed to the other power transmission shaft, and plural arms for linking the inner rim and the outer rim, which are formed integrally.

According to this mechanical fuse, the arms compose rupture portions, and the arms are integrated with the inner rim and the outer rim. Because of one-body structure made of Fe-based sintered alloy, the fatigue limit ratio of arms (rupture portions) and the mechanical strength of the inner rim and outer rim are maintained at high level, and further assembling process is not necessary. Such mechanical fuse is used, for example, as shaft coupling.

The manufacturing method of mechanical fuse of the present invention is a manufacturing method optimum for the mechanical fuse of the present invention, and comprises a compression forming step for compressing and forming into a specified shape by using a mixed powder of iron powder, and nickel powder, copper powder, molybdenum powder, ferromanganese powder, or ferrochromium powder so as to adjust the content of at least one element of Ni, Cr, Mo, Mn, and Cu to 0.7 to 5 mass %, and graphite powder with the C content of 0.1 to 0.7 mass %; a sintering step for sintering the green compact obtained in the compression forming step; and a steam treating step for treating the sintered compact obtained in the sintering process in steam.

In the manufacturing method of the present invention, the material powder is not iron alloy powder, but is a mixed powder in which powder of additive element is added with iron powder. As a result, the metallurgical binding of iron particles is promoted in a diffusion process of the additive element to iron while sintering, and the fatigue strength is enhanced while the matrix is reinforced by alloying.

The steam treatment is a treatment for forming an iron oxide ($Fe_3O_4$) in high temperature steam atmosphere (for example, 370 to 380° C.) to the sintered compact, and the steam permeates from the surface layer of the sintered compact into the inner part, reaching the surface layer and the pore inner wall, and these parts rust, and an iron oxide ($Fe_3O_4$) phase is formed. Such iron oxide phase forms round pores as mentioned above, and the notch sensitivity becomes dull. As a result, the tensile strength is lowered, but the fatigue strength is enhanced, and the fatigue limit ratio becomes higher. The steam treatment can be executed by using a mesh belt furnace or a pot furnace capable of maintaining a high atmospheric pressure, but the latter one is advantageous because more oxide can be formed into deeper parts.

As a method for forming round pores, the activated sintering method, high temperature sintering method, and liquid phase sintering method are shown above, and in the case of the activated sintering method, since graphite contained in the green compact is burnt by oxygen contained in the green compact while sintering and the amount of binding C is less than the rate of the graphite content, and graphite powder must be additionally given to compensate for the loss of C. The high temperature sintering method consumes more heating energy and is hence costly. In the liquid phase sintering method, excessive addition of liquid phase generating element causes to lower the fatigue limit ratio, and hence the amount of addition must be controlled carefully, and also dimensional differential are large, and due caution is needed in management of dimensions.

Thus, various activated sintering methods are effective, but the steam treatment does not require such cautions, and is most appropriate as means for forming an iron oxide phase, forming round pores, and enhancing fatigue limit ratio.

The manufacturing method of the present invention is characterized by further comprising a soft nitriding process after the steam treatment. As mentioned above, by the nitriding process, the residual compressive stress is given, the fatigue strength is improved, and the fatigue limit ratio is further increased, and the wear resistance is enhanced at the same time.

In the present invention, a process for providing mechanical compressive residual stress such as shot peening, mechanical plating, etc., is preferably executed between or after the sintering process, the steam treating process and the soft nitriding process. As mentioned above, by the process for providing mechanical compressive residual stress, the fatigue strength is reinforced, and the fatigue limit ratio is enhanced.

In the final process of the present invention, a film of flaky particles of zinc or zinc-iron alloy is laminated on the surface by a mechanical plating process, and the composition is further immersed in an aqueous disperse solution containing metal zinc flakes, chromic acid anhydride and glycol, and is then heated, so that the surface is coated with zinc chromate film.

In the mechanical plating process, composite particles in which zinc particles or zinc-iron alloy particles are adhered to around iron particles are sprayed to the sintered compact surface by same technique as shot peening, and the surface is laminated with a film of flaky zinc particles or zinc-iron alloy particles. In this case, iron core particles are expelled away by the impact of spraying. In the next process, by immersing in an aqueous disperse solution containing metal zinc flakes, chromic acid anhydride and glycol, and then heating, the zinc chromate film is baked. The temperature of this heating process is preferably about 300° C., and hexavalent chromium is reduced by organic matter in this heating process, and water-insoluble amorphous $nCrO_3 \cdot mCr_2O_3$ is generated, which acts as a binder, and laminated zinc flakes are mutually bound, and a zinc chromate film is formed.

The mechanical fuse thus coated with the zinc chromate film is effectively sealed in the surface pores as mentioned above, and oxidation is prevented by zinc chromate film superior in corrosion resistance, and lowering of rupture stress is suppressed, and the rupture reliability is further enhanced.

DETAILED DESCRIPTION OF THE PREFERRED EMBODIMENT

Figure 1:
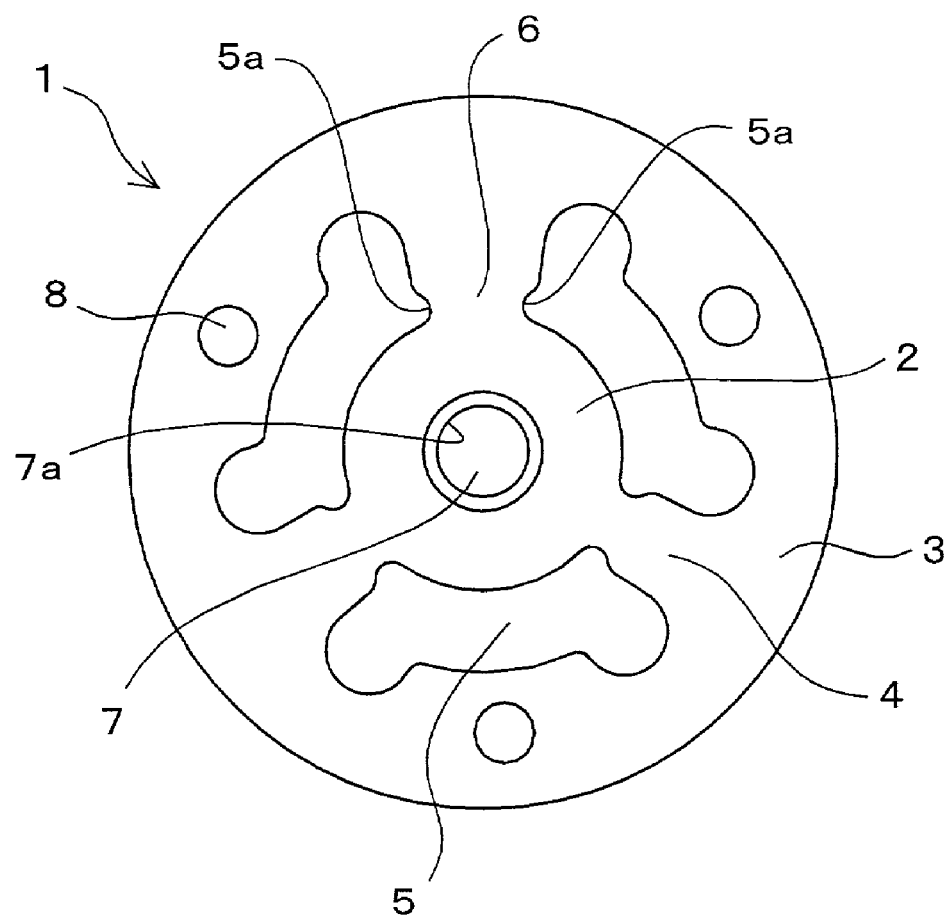
FIG. 1 is a front view of a mechanical fuse according to an embodiment of the present invention.

An embodiment of the present invention is described while referring to the accompanying drawing.

FIG. 1 shows a disc-shaped mechanical fuse 1 made of Fe-based sintered alloy in an embodiment of the present invention. The mechanical fuse 1 is interposed between two power transmission shafts not shown, and comprises an inner rim 2 for fixing the end of one power transmission shaft, an outer rim 3 for fixing the end of the other power transmission shaft, and plural (three in this case) arms 4 for linking the inner rim 2 and outer rim 3, which are formed integrally.

The inner rim 2 and outer rim 3 are divided by plural (three in this case) circular slits 5 formed between them, and an inner peripheral side of the slits 5 is the inner rim 2, and an outer peripheral side is the outer rim 3. Adjacent slits 5 form arms 4 extending in the radial direction. The arms 4 form shear plates, and at the inner peripheral side end, a bottleneck portion which is narrow in width is formed as being held by a semicircular notch 5a forming a part of slits 5, and this bottleneck portion is set in a rupture portion 6. The inner rim 2 and outer rim 3 have a specified wall thickness for assuring a strength necessary as structural member.

A shaft hole 7 is formed in the center of the inner rim 2, and female threads 7a are formed in the inner circumference of the shaft hole 7 for engaging with male threads formed at the leading end of one power transmission shaft. The female threads 7a are formed after sintering. On the other hand, in the outer rim 3, bolt holes 8 for fixing the other power transmission shaft are formed at positions corresponding to the slits 5. In the mechanical fuse 1, one power transmission shaft is fixed to the inner rim 2 by tightening the male threads at the leading end to the female threads 7a, and the other power transmission shaft is fixed to the outer rim 3 by bolting through the bolt holes 8. That is, the two power transmission shafts are coaxially coupled by way of the mechanical fuse 1.

According to this mechanical fuse 1, for example, rotating power is transmitted from the power transmission shaft fixed to the inner rim 2 to the power transmission shaft fixed to the outer rim 3 by way of the mechanical fuse 1. In the midst of transmission of rotating power, if a large difference is caused between the two shafts and a specified rupture stress is applied to the rupture portion 6, the rupture portion 6 is broken and the power transmission is cut off by force.

EXAMPLES

The effect of the present invention is proved by its examples. In the following explanation, the percentage relating to the blending rate or composition is the percentage by mass.

(1) Steam Treatment and Fatigue Limit Ratio

A mixed powder of iron powder was prepared by adding 0.5% of graphite powder, 2.0% of copper powder, and 0.75% of zinc stearate powder, and this powder was compressed by die assembly to a density of 6.5 g/cm$^3$, and a green compact was obtained. This green compact was sintered in reducing gas atmosphere at 1130° C., and a sinter was obtained. The C content in this sintered compact was found to be 0.3% by investigating the metal texture. The obtained sintered compact was cut, and tensile test pieces and Ono type rotary bend fatigue test pieces were prepared. Test pieces of the example were treated in steam at 570° C. in mesh belt furnace and pot furnace. In each test piece, the tensile strength, rotary bend fatigue strength, and fatigue limit ratio (rotary bend fatigue strength÷tensile strength) were measured. Metal texture of each test piece was magnified by 400 times and the taken images were analyzed by image analysis software (trade name: Win ROOF, produced by Mitani Shoji Co., Ltd.), and the area of pores and peripheral length of pores were measured, and the roundness was determined. The results are shown in Table 1.

TABLE 1

| Steam treatment | Roundness | Tensile strength (MPa) | Fatigue strength (MPa) | Fatigue limit ratio |
|---|---|---|---|---|
| Not treated | 0.0033 | 363 | 99 | 0273 |
| Mesh belt furnace (570° C. × 5 min) | 0.0040 | 334 | 121 | 0.362 |
| Mesh belt furnace (570° C. × 15 min) | 0.0077 | 316 | 137 | 0.434 |
| Pot furnace (570° C. × 180 min) | 0.0125 | 305 | 149 | 0.489 |

As is apparent from Table 1, by steam treatment, the tensile strength is lowered, but the roundness is enhanced and the fatigue strength is improved, and hence the fatigue limit ratio is raised. The fatigue limit ratio of the test pieces using the pot furnace is higher than that using the mesh belt furnace. In this example, as compared with the sample having no treatment, the fatigue limit ratio was improved by about 80% at maximum. When the roundness was 0.004 or more, and an improving effect of fatigue limit ratio was confirmed.

(2) Metal Additive Element and Fatigue Limit Ratio

With the contents of graphite power and zinc stearate powder added to iron powder fixed at 0.5% and 0.75%, respectively, metal powder or ferroalloy powder was further added so that the content of one element selected from the group consisting of Ni, Cu, Mo, Cr, and Mn be 0.1%, 0.7%, 2%, 5%, and 6%, and samples No. 1 to No. 15 of mixed powder were prepared as shown in Table 2. Each mixed powder was compressed by die assembly to a density of 6.5 g/cm$^3$, and a green compact was obtained, and the green compact was sintered in reducing gas atmosphere at 1130° C., and a sintered compact was obtained. The C content in the sintered compact was found to be 0.3% by investigating the metal texture. The obtained sintered compact was cut, and tensile test pieces and Ono type rotary bend fatigue test pieces were prepared. Test pieces were treated in steam at 570° C. in mesh belt furnace. In each test piece, the tensile strength, rotary bend fatigue strength, and fatigue limit ratio were measured. The results are shown in Table 2.

TABLE 2

| Sample No. | Additive element | Content (mass %) | Tensile strength (MPa) | Fatigue strength (MPa) | Fatigue limit ratio |
|---|---|---|---|---|---|
| 1 | Ni | 0.1 | 240 | 75 | 0.31 |
| 2 | | 0.7 | 305 | 120 | 0.39 |
| 3 | | 2.0 | 379 | 164 | 0.43 |
| 4 | | 5.0 | 470 | 168 | 0.36 |
| 5 | | 6.0 | 520 | 168 | 0.32 |
| 6 | Cu | 0.1 | 200 | 60 | 0.30 |
| 7 | | 0.7 | 255 | 90 | 0.35 |
| 8 | | 2.0 | 316 | 137 | 0.43 |
| 9 | | 5.0 | 400 | 140 | 0.35 |
| 10 | | 6.0 | 440 | 141 | 0.32 |
| 11 | Mo | 0.1 | 160 | 50 | 0.31 |

TABLE 2-continued

| Sample No. | Additive element | Content (mass %) | Tensile strength (MPa) | Fatigue strength (MPa) | Fatigue limit ratio |
|---|---|---|---|---|---|
| 12 | | 0.7 | 207 | 83 | 0.40 |
| 13 | | 2.0 | 253 | 110 | 0.43 |
| 14 | | 5.0 | 321 | 112 | 0.35 |
| 15 | | 6.0 | 359 | 113 | 0.31 |
| 16 | Cr | 0.1 | 150 | 45 | 0.30 |
| 17 | | 0.7 | 192 | 77 | 0.40 |
| 18 | | 2.0 | 237 | 103 | 0.43 |
| 19 | | 5.0 | 300 | 105 | 0.35 |
| 20 | | 6.0 | 330 | 106 | 0.32 |
| 21 | Mn | 0.1 | 140 | 38 | 0.27 |
| 22 | | 0.7 | 185 | 65 | 0.35 |
| 23 | | 2.0 | 221 | 96 | 0.43 |
| 24 | | 5.0 | 284 | 98 | 0.35 |
| 25 | | 6.0 | 308 | 99 | 0.32 |

As is apparent from Table 2, the improving rate of tensile strength is high up to the content of about 2% in all elements, and tends to be moderate at higher contents. By element, Ni contributes most to improvement of tensile strength, and the improving effect becomes smaller in the sequence of Cu, Mo, Cr, and Mn. It is therefore known possible to adjust the level of static strength by the kind of the additive element. The relation of additive element and its content with the fatigue strength is similar to that with the tensile strength.

The fatigue limit ratio is predicted to be smaller than 0.3 in the absence of additive element. As the content of the additive element increases, the fatigue limit ratio becomes higher, and reaches the maximum of 0.43 at the content of 2 to 3.5%, and decreases at higher contents. The range of content of additive element for improving the fatigue limit ratio to 0.35 or higher is 0.7 to 5%.

(3) C Content and Fatigue Limit Ratio

With the contents of copper power and zinc stearate powder added to iron powder fixed at 2.0% and 0.75%, respectively, mixed powders were prepared by changing the content of graphite powder, that is, 0.2%, 0.3%, 0.5%, 1%, and 1.1%. These mixed powders were compacted, sintered and treated in steam in the same manner as in (2), and test pieces were obtained. The C contents in these test pieces were 0.02%, 0.10%, 0.30%, 0.70%, and 0.80%. The sample with 0.02% of C could not be investigated by metal texture and was analyzed chemically. In other samples, the C content was determined by metal texture. In each test piece, the tensile strength, rotary bend fatigue strength, and fatigue limit ratio were measured. The results are shown in Table 3.

TABLE 3

| C content (mass %) | Tensile strength (MPa) | Fatigue strength (MPa) | Fatigue limit ratio |
|---|---|---|---|
| 0.02 | 120 | 36 | 0.30 |
| 0.10 | 208 | 81 | 0.39 |
| 0.30 | 316 | 137 | 0.43 |
| 0.70 | 431 | 151 | 0.35 |
| 0.80 | 457 | 151 | 0.33 |

As is apparent from Table 3, when the C content is in a range of 0.10 to 0.70%, the fatigue limit ratio is 0.35 or higher, the maximum of 0.43 is obtained at the C content of 0.3 to 0.5%. In order to assure a relatively high fatigue limit ratio, the C content is estimated to be in a range of 0.15 to 0.6%.

(4) Soft Nitriding and Fatigue Limit Ratio

A mixed powder of iron powder was prepared by adding 0.5% of graphite powder, 2.0% of copper power, and 0.75% of zinc stearate powder, and these mixed powders were compacted, sintered and treated in steam in the same manner as in (2), and test pieces were obtained. As gas soft nitriding treatment, test pieces were heated in ammonia gas for 60 minutes at 580° C. In gas soft nitrided piece and control piece (steam treatment only), the tensile strength, rotary bend fatigue strength, and fatigue limit ratio were measured. The results are shown in Table 4.

TABLE 4

| Gas soft nitriding | Tensile strength MPa | Fatigue strength MPa | Fatigue limit ratio |
|---|---|---|---|
| Not treated | 316 | 137 | 0.43 |
| Treated | 302 | 159 | 0.53 |

As is apparent from Table 4, by gas soft nitriding treatment, the fatigue strength was improved, and it was confirmed that the fatigue limit ratio was substantially enhanced. It is estimated that residual compressive stress is given by gas soft nitriding treatment.

(5) Zinc Chromate Treatment and Fatigue Limit Ratio

In sample No. 8 (steam treated) in Table 2, zinc chromate treatment was applied. For this treatment, Dacrodized (tradename) produced by Dacro Shamrock Japan Co., Ltd., was used. In the treatment, first, composite particles of zinc-iron alloy particles were sprayed in the same technique as shot peening, and a film of flaky zinc-iron alloy particles was laminated on the surface by mechanical coating, then it was immersed in aqueous disperse solution containing metal zinc flakes, chromic acid anhydride, and glycol, and heated for 12 hours at 300° C., and a zinc chromate film was baked.

In samples with and without zinc chromate treatment (both taken from sample No. 8 in Table 2), salt spray test conforming to JIS Z 2371 was conducted for 200 hours, and the tensile strength, rotary bend fatigue strength, and fatigue limit ratio were determined. The results are shown in Table 5.

TABLE 5

| Zinc chromate treatment | Tensile strength MPa | Fatigue strength MPa | Fatigue limit ratio |
|---|---|---|---|
| Not treated | 148 | 44 | 0.30 |
| Treated | 316 | 137 | 0.43 |

Comparing sample No. 8 between Table 5 and Table 2, the test piece treated by zinc chromate was not changed in fatigue limit ratio after salt spray test, but it is known that the test piece without treatment was extremely lowered in tensile strength and fatigue strength and was also lowered in fatigue limit ratio. When the appearance was observed, in the treated sample, the appearance kept a silver white color after salt spray test, and it was surmised that the surface was sealed and the corrosion resistance was improved. In contrast, in the control sample, red rust was gathered on the surface, and the rust was estimated to propagate deeper inside because the tensile strength and fatigue strength were lowered.

What is claimed is:

1. A mechanical fuse comprising:
   a driving portion to which rotating force is transmitted;

a driven portion to which the rotating force is transmitted from the driving portion; and a rupture portion which transmits the rotating force from the driving portion to the driven portion and is broken when a rotating force is loaded thereto;

wherein the rupture portion is composed of Fe-based sintered alloy, and the roundness of pores of the Fe-based sintered alloy is 0.004 or more, wherein at least one of Ni, Cu, Mo, Cr, and Mn is contained in a total amount of 0.7 to 5 mass %, and the C content in overall composition is 0.1 to 0.7 mass %.

2. The mechanical fuse according to claim 1, wherein an iron oxide phase is formed in a surface layer and pore inner wall.

3. The mechanical fuse according to claim 1, wherein a treatment for providing residual compressive stress is applied.

4. The mechanical fuse according to claim 3, wherein the treatment for providing residual compressive stress is shot peening.

5. The mechanical fuse according to claim 1, wherein a soft nitriding treatment is applied.

6. The mechanical fuse according to claim 1, composed of Fe-based sintered alloy, wherein this mechanical fuse is interposed between two power transmission shafts and comprises an inner rim fixed to one power transmission shaft, an outer rim fixed to the other power transmission shaft, and plural arms for linking the inner rim and outer rim, which are formed integrally.

7. The mechanical fuse according to claim 1, wherein the driving portion, the driven portion, and the rupture portion are formed integrally.

8. The mechanical fuse according to claim 1, wherein the mechanical fuse has a fatigue limit ratio determined by (fatigue strength)/(tensile strength) of 0.35 to 0.53.

9. A mechanical fuse comprising:

a driving portion to which rotating force is transmitted;

a driven portion to which the rotating force is transmitted from the driving portion; and a rupture portion which transmits the rotating force from the driving portion to the driven portion and is broken when a rotating force is loaded thereto;

wherein the rupture portion is composed of Fe-based sintered alloy, and the roundness of pores of the Fe-based sintered alloy is 0.004 or more, wherein a treatment for providing residual compressive stress is applied, and the treatment for providing residual compressive stress is mechanical plating.

10. A mechanical fuse comprising:

a driving portion to which rotating force is transmitted;

a driven portion to which the rotating force is transmitted from the driving portion; and a rupture portion which transmits the rotating force from the driving portion to the driven portion and is broken when a rotating force is loaded thereto;

wherein the rupture portion is composed of Fe-based sintered alloy, and the roundness of pores of the Fe-based sintered alloy is 0.004 or more, and a zinc chromate film is coated on the surface.

* * * * *